United States Patent [19]
Villa-Real

[11] 4,345,819
[45] Aug. 24, 1982

[54] MULTI-ANGULAR PANORAMIC AUTOMOTIVE REAR VIEW MIRROR

[76] Inventor: Antony-Euclid C. Villa-Real, 2512 Capistrano Ave., Las Vegas, Nev. 89121

[21] Appl. No.: 116,499

[22] Filed: Jan. 29, 1980

[51] Int. Cl.³ .............................. B60R 1/08; G02B 5/08
[52] U.S. Cl. .................................................. 350/304
[58] Field of Search ....................... 350/299, 303, 304; D12/187, 189

[56] References Cited

U.S. PATENT DOCUMENTS

| | | | |
|---|---|---|---|
| D. 231,520 | 4/1974 | Harrison | D12/187 |
| D. 244,271 | 5/1977 | Harrison | D12/187 |
| 3,021,756 | 2/1962 | Milton et al. | 350/304 |
| 3,028,794 | 4/1962 | Kinkella | 350/303 |
| 3,145,257 | 8/1964 | Suga | 350/304 |
| 3,411,843 | 11/1968 | Moller | 350/303 |
| 3,826,563 | 7/1974 | Davis | 350/304 X |
| 4,019,812 | 4/1977 | Carnine | 350/304 |
| 4,201,451 | 5/1980 | Jacob | 350/303 |

FOREIGN PATENT DOCUMENTS

258355  1/1964  Australia ............................ 350/304

*Primary Examiner*—F. L. Evans

[57] ABSTRACT

A centrally placeable multi-angularly manipulatable combination automotive rear view mirror having a plurality of integral flat optically non-distorting reflective faces inter-connected by moveable but firm connecting means; each respective face capable of being positioned optimally by the driver to provide him with a much greater than ordinary scope of vision from both the rear-left side and the rear-right side including the direct rear view of the traffic environment, thus solving the risk factors such as the so-called right-sided rear blind-spot and also diminishing the frequent head turning and common visual disruption to the driver relevant to his important frontal attention during driving. Each corresponding integral face is provided with respective arrow indicia both for instructional purposes to the driver on the proper directional tilt required for each said integral face and also to effectively achieve the functional capability of constantly reminding the driver regarding the proper directional right or left rear view conditions relative to the correspondingly tilted mirror face he is watching.

23 Claims, 33 Drawing Figures

MULTI-ANGULAR PANORAMIC AUTOMOTIVE REAR VIEW MIRROR

BACKGROUND OF THE INVENTION

Since it is of utmost importance to the driver to have his attention to driving to its maximum, the unnecessary randomized shifting of the eyes and head movements, as in the case of his utilization of a combination of variously located fixed rear view mirrors common to most automobiles should definitely be solved.

Currently before shifting to the right lane or before turning right, it is the routine practice among drivers to turn his head to the right as quickly as possible to ensure him that no immediate vehicle or vehicles at and around the so-called right blind-spot are within dangerous range before he can make the right decision. Meanwhile, the time lapse during this shift of visual and mental attention creates a hazardous condition because of the diminution of his attention to frontal driving. This condition becomes even more blown into greater proportion especially during fast driving, thus increasing the danger of possible accident. Although there are several rear view mirrors used in combination as mentioned above, the locations of the said various mirrors are not centralized, so that the driver must frequently shift his eyes from one mirror to the others; one mirror having its usual location to his left side, another being situated centrally inside the vehicle, and yet another one located exteriorly and to his extreme right. This combination of mirrors in various locations that are far apart is not conducive to safe driving.

There are mirrors that are convex in facial configuration to provide a wider view of the rearward traffic conditions, however, the images of other vehicles as well as pedestrians become distorted, and, at the same time there results an alteration in visual reflections of extra-vehicular objects therearound the lateral and rearward traffic environment that oftentimes lead to miscalculations on the part of the driver.

Certain mirror systems consist of a composite of several differently angled fixed reflective faces that are altogether set on a singular back plate. But the problem is the lack of independent flexibility of angular positioning of each reflective face.

There are other mirrors that are longer than ordinary. Some of which are even made to occupy the entire frontal section of the vehicle. However, though the aim of many manufacturers is to solve the problem of the said blind-spot, and to provide greater range of visibility, this kind of solution alone cannot bring forth optimal provision for wider visual angular scope. This is because of the lack of manipulative flexibility of the mirror systems.

Another problem that arises from the use of the described latter existing mirrors is their greater total length which add to the obstruction to the frontal view of the driver. Other rear view mirrors employ an exterior protrusion at the automobile's front roofing utilizing the periscope principle. This can be quite expensive. The latter kinds of above mentioned rear view mirrors definitely bring forth negative reactions to the driver because the frontal interior section of the vehicle immediately before his eyes becomes very busy due to intensified visual conteractions with regards to the traffic conditions thus taking away part of his frontal attention to driving.

From the neuro-physiological standpoint, the total bombardment of nervous impulses reaching the visual area of the brain creates a rather phychological confusion to the driver because of the randomized visual feedback to his brain.

SUMMARY OF THE INVENTION

It is one object of the instant invention to provide a mirror system which affords a greater range of vision towards the rear and side of the automobile simultaneously with direct rear vision of the road traffic conditions.

It is another object of the invention to provide a mirror system having at least a pair of mirrors which can be moved simultaneously or relative to each other to vary and enlarge the reflective field.

Another object of the invention is to provide a mirror system which eliminates the so-called blind-spot area and provides a larger field of vision.

Another object of the present invention is to provide a mirror system which can either be of a permanent type mounting or an easily attachable and removable clip-on type mounting.

Yet another object of the present invention is to provide indicia means on the respective mirrors to indicate to the driver the direction of view of the respective mirrors.

Yet another object of the present invention is to provide indicia means to indicate to the driver the proper directional tilt of each respective mirrors.

Yet another object of the present invention is to provide an adjustable mirror system which is simple and durable in construction, economical to manufacture, and neat and attractive in appearance.

Other objects and advantages will become apparent from the following description and the appended claims in conjunction with the accompanying drawings.

BRIEF DESCRIPTION OF THE INVENTION

Figure 1:
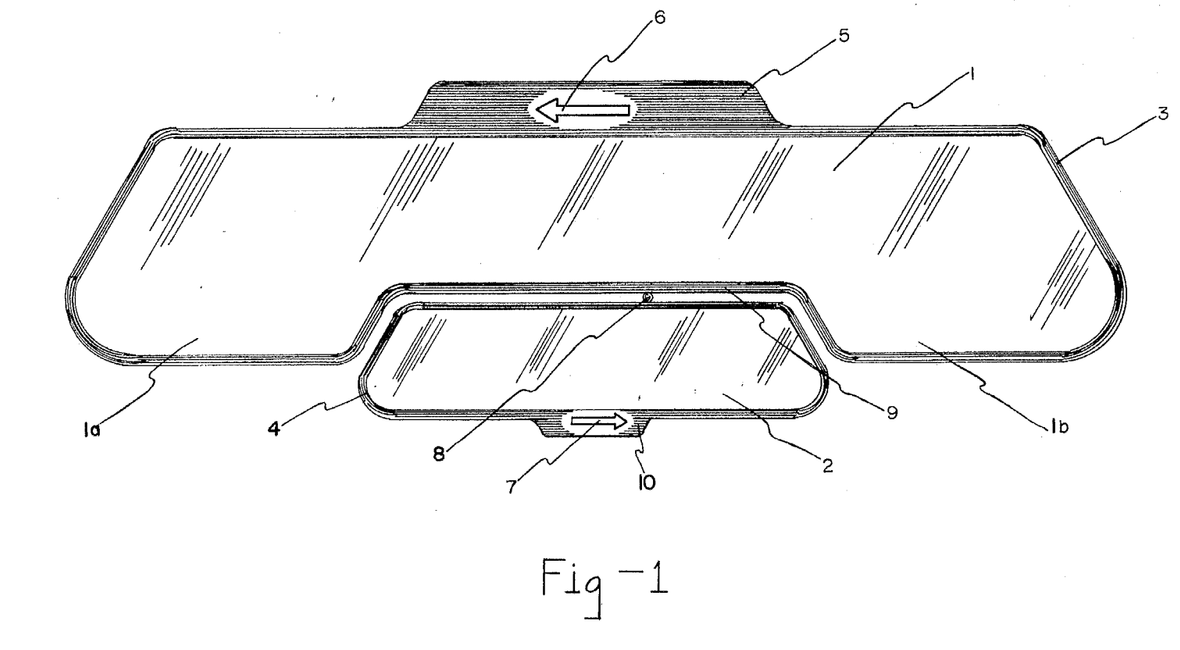
FIG. 1 is a front elevational view of a rear view mirror system illustrative of the invention.
Figure 2:
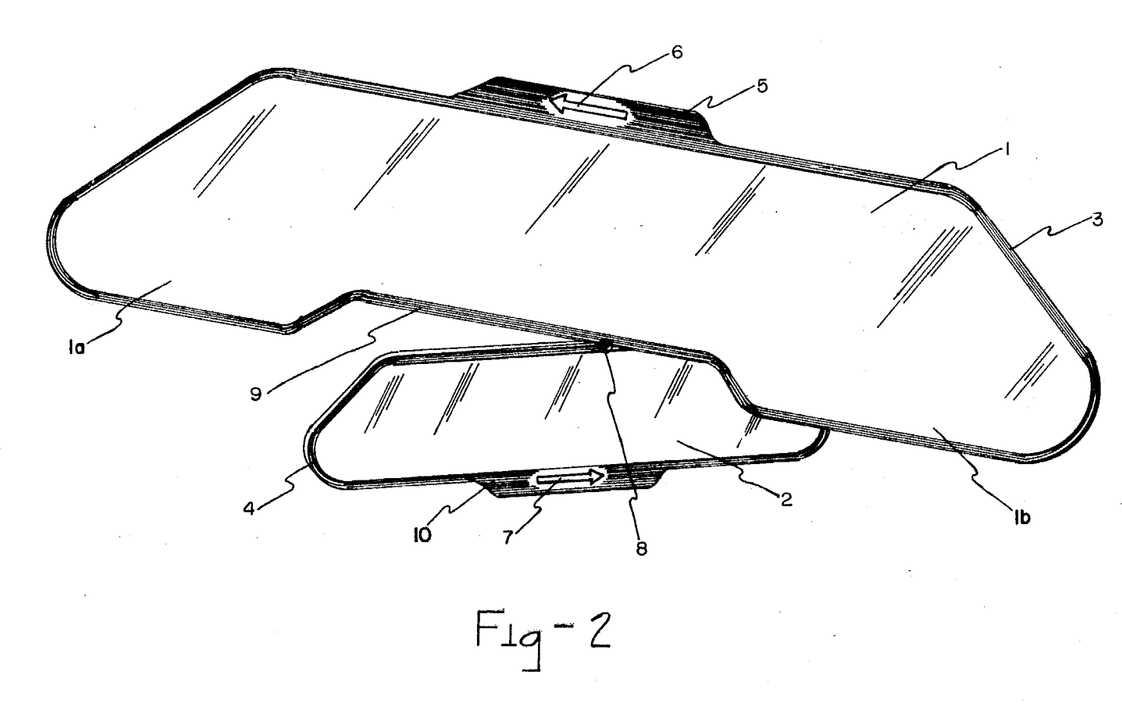
FIG. 2 is a front elevational view of the mirror system in an angular adjusted position.

Referring to the drawings wherein like numerals and like letter-numeral combinations refer to like elements there is shown at FIG. 1 one preferred embodiment of the rear view mirror system. The mirror system includes a main or upper front mirror 1 including portions 1a and 1b enclosed by main frame 3 continuing at the back as 3a and 3b shown in FIG. 3. Attached to frame 3 as shown in FIG. 1, there is a raised portion 5 which includes indicia means 6 thereon. The indicia means is shown in the form of a leftwise directed arrow to indicate the left side viewing and may be of luminous material to be seen by the driver during operation of the vehicle at night. The dependent mirror indicated generally at 2 is enclosed by frame 4 which is attached to the main frame 3 by means of a movable joint 8 which is shown to be off-centered with respect to frames 3 and 4. Frame 4 includes a central lower protrusion 10 which includes a rightwise directed arrow indicia that may also be made of luminous material for night-time driving. Both the leftwise and the rightwise directed arrow indicia having the function of instructing the driver of the correct directional tilt of the respective mirrors as well as to constantly remind the driver of the corresponding direction of viewing.

Main mirror 1 includes a cut-out or indented portion 9 which is complimentary to the shape of the dependent mirror 2 allowing the overall width of the two mirrors to be only slightly wider than the main mirror 1.

Figure 3:
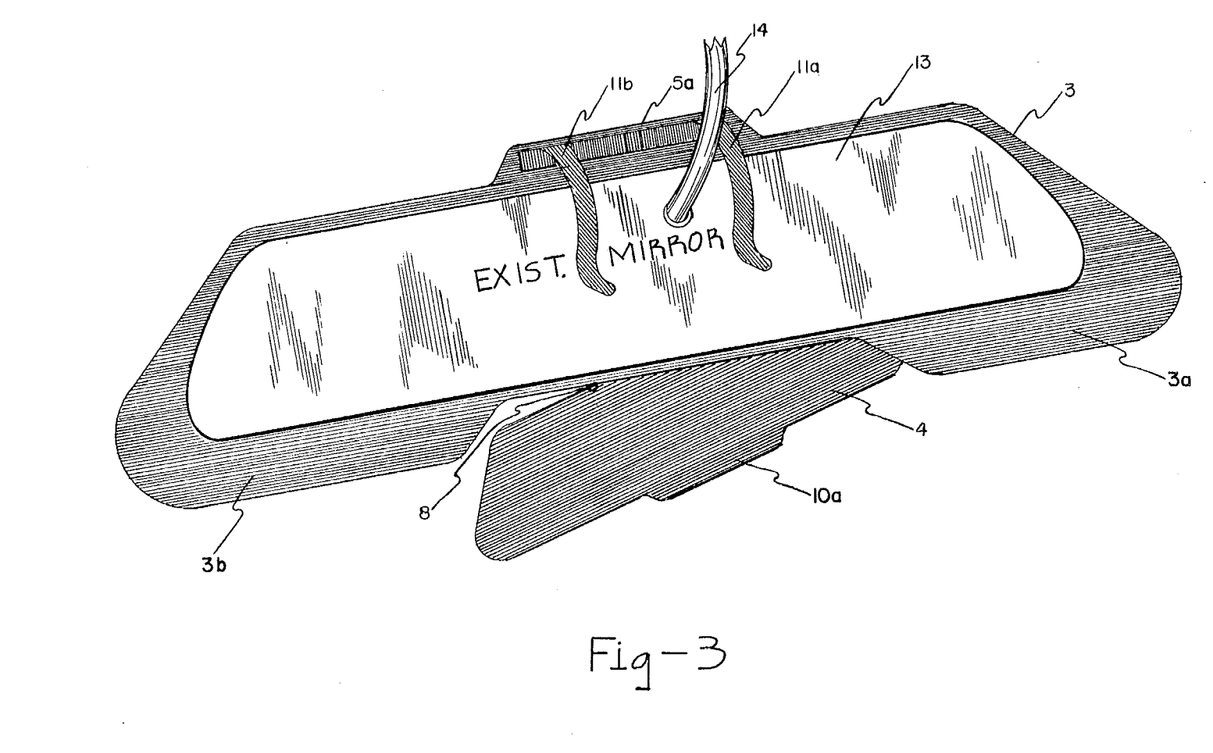
FIG. 3 is a rear elevational view of the instant mirror system shown in FIG. 1 attached to an existing rear view mirror by clip-on means.

The attachment means shown in FIG. 3 includes a pair of clips 11a and 11b which clip over the existing rear view mirror 13 dependent from conventional attachment means 14. The clip-on attachment provides for easy and quick attachment and removal of the mirror system from a single conventional rear view mirror.

Figure 4:
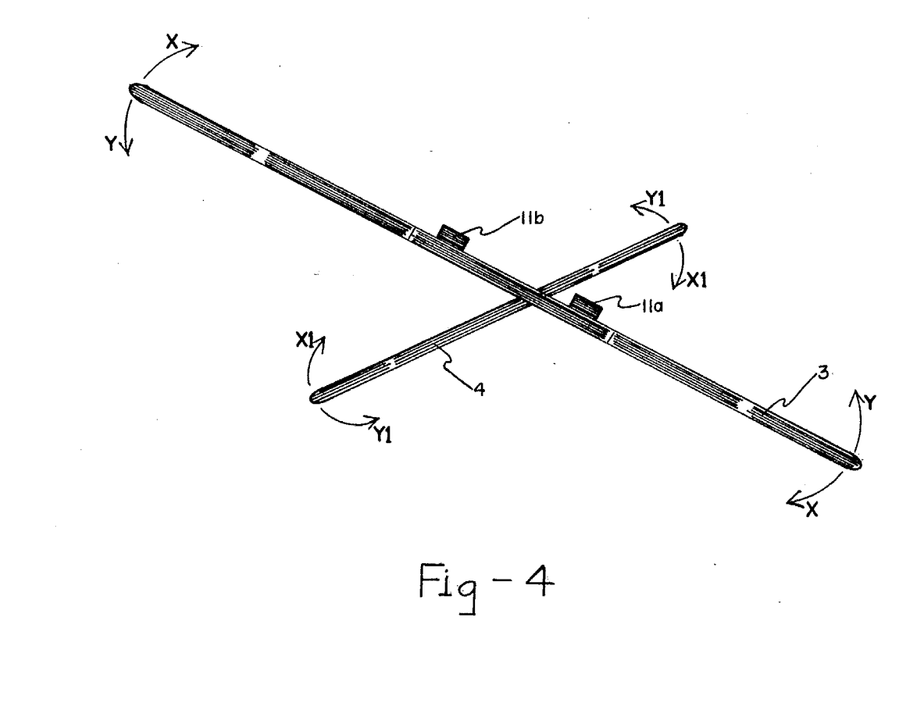
FIG. 4 is a top view of the mirror system showing the mirrors adjusted relative to each other, as well as showing the clip-on means.

In FIG. 4, X is shown as the clockwise direction of angular adjustment of the main mirror 3, and, Y represents the counter-clockwise direction of angular adjustment of the same main mirror 3; whereas $X_1$ illustrates the clockwise direction of the angular adjustment of the dependent mirror 4, and, $Y_1$ designates the counter-clockwise direction of angular adjustment of the mirror 4.

Figure 5:
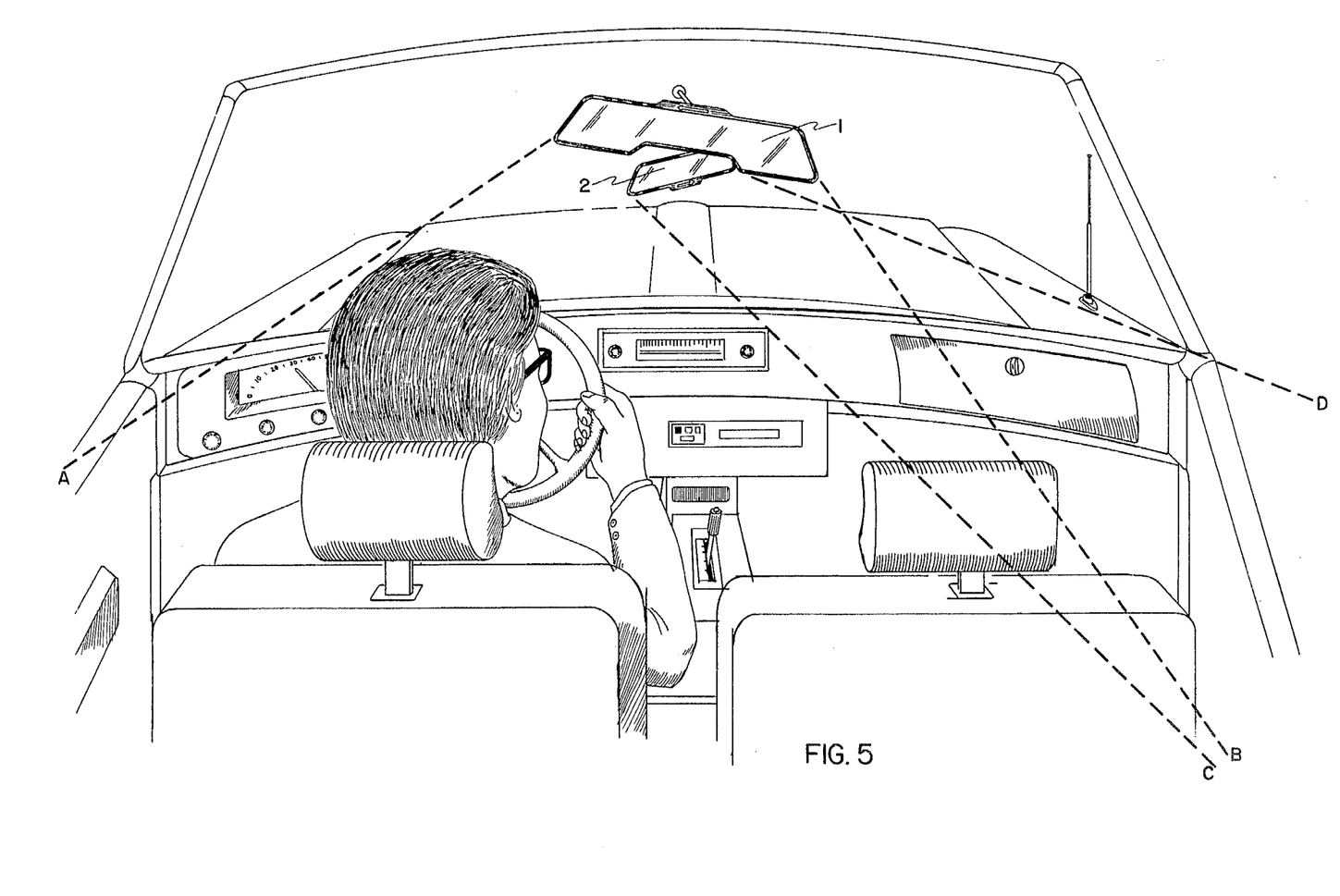
FIG. 5 is a perspective view of the instant mirror system as applied to an automobile.

In FIG. 5, is shown the mirror system of the present invention as attached to the automobile, and, wherein the main mirror and the dependent mirror are respectively correctly tilted and angled with respect to other and relative to the vehicle, the combination of said mirror arrangement resulting in greater multiangular panoramic scope of rear and lateral vision. Main mirror 1 gives a scope of vision approximately ranging from A to B as represented by the respective broken lines emanating from the main mirror. Dependent mirror 2 gives an additional scope of angular vision ranging from C to D as represented by broken lines emanating from dependent mirror 2 which is generally used to eliminate the dangerous right sided rear blind-spot.

Figure 6:
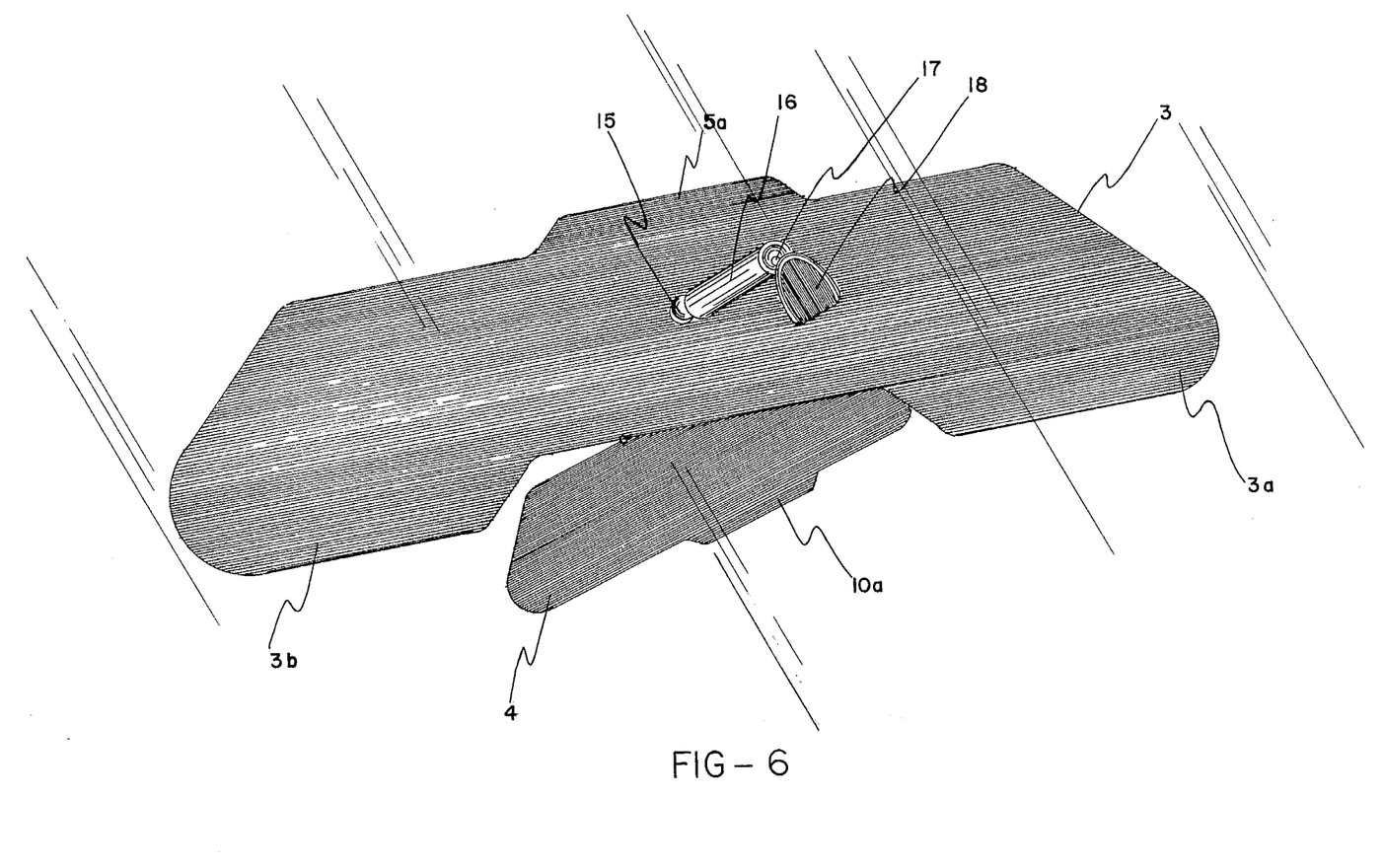
FIG. 6 is a rear elevational view of the mirror system of the present invention showing a permanent-type connection for application to the internal face of the front windshield of an automobile.
Figure 7:
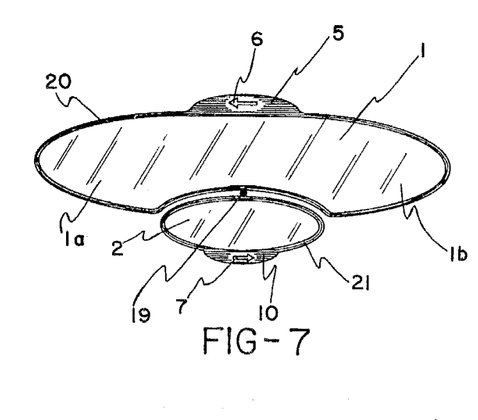
FIGS. 7 and 8 are front elevational views of a mirror system of the present invention for use on a smaller or sports car type automobiles.
Figure 8:
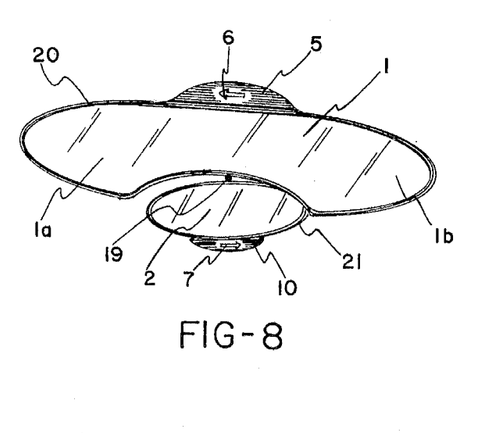
Figure 9:
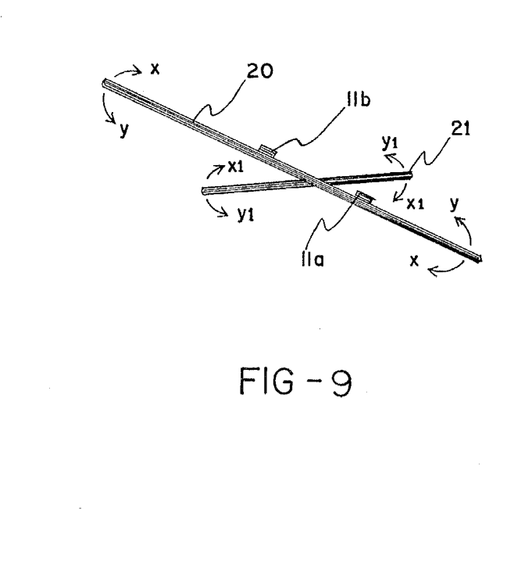
FIG. 9 is a top view of the mirror system of FIG. 8 showing the mirrors adjusted relative to each other and showing the clip-on means.
Figure 10:
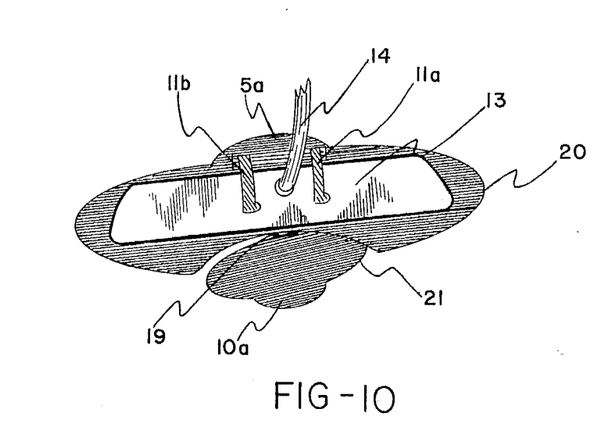
FIG. 10 is a rear elevational view of the mirror system of FIG. 7 and FIG. 8 showing a clip-on attachment of an existing mirror.
Figure 11:
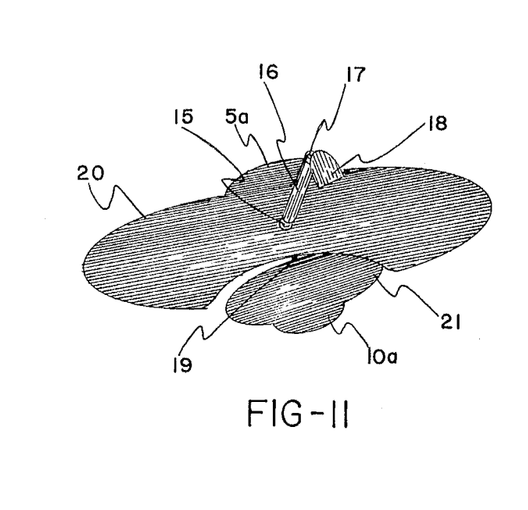
FIG. 11 is a rear elevational view of the mirror system of FIGS. 7 and 8 showing a single post-type permanent windshield mounting.
Figure 12:
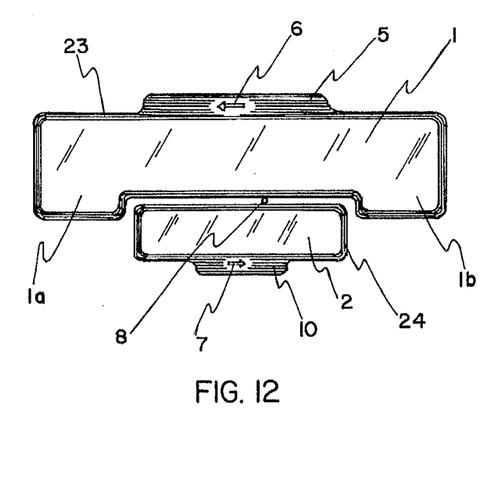
FIGS. 12, 13, 17, 18 and 19 are front elevational views of stylized shapes of the mirror system of the present invention.
Figure 13:
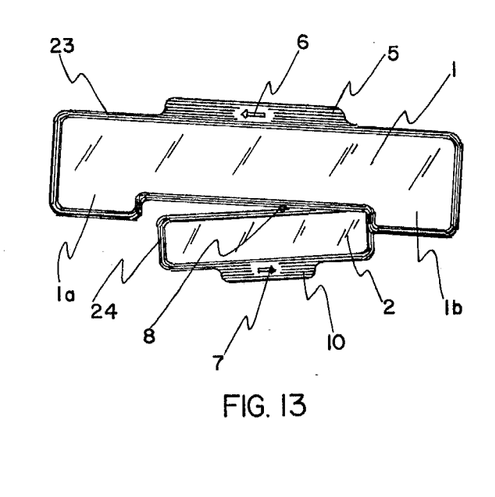
Figures 14, 17:
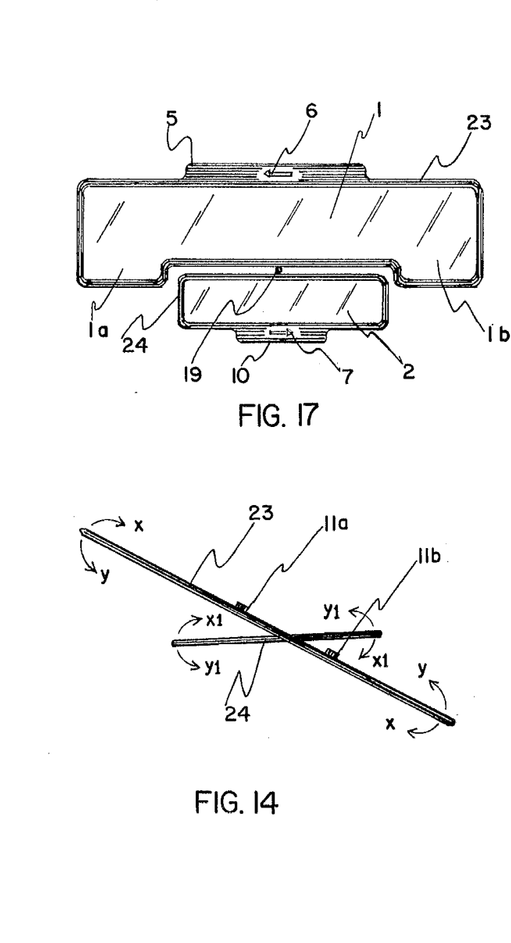
FIGS. 14 and 20 are top views of the associated mirror system adjusted relative to each other, and, ashowing the clip-on means.
Figure 15:
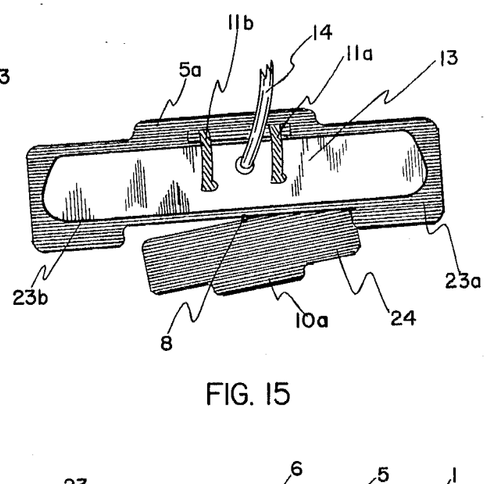
FIGS. 15 and 21 are rear elevational views of FIGS. 13 and 19 showing a clip-on attachment to an existing mirror.

The attachment means shown in FIG. 6 includes a pivotal connection 15 attached to single central post 16 connected by pivotal means 17 and attached by adhesive portion 18 to the internal face of the front windshield indicated by the series of slanted shadings. This type of attachment is used when a permanent mirror system would be installed, for example, on new automobiles.

The mirror system shown in FIGS. 7 through 11 employs the same features described in FIG. 17, but on a smaller scale and of a different shape so as to be adapted for use on smaller or sports car size automobiles. The main mirror 1 supported by frame 20 is generally of an oval shape and has a front viewing area extending from 1a to 1b, including a cut-out or recess portion to receive the dependent mirror 2 supported by frame 21 attached by central pivotal connection 19. The variously adjusted angles for each respective mirror are accomplished by clockwise directed movement X, and, counter-clockwise direction Y for the main mirror frame 20, and, by clockwise direction $X_1$ and counter-clockwise direction $Y_1$ for the dependent mirror frame 21.

Figure 16:
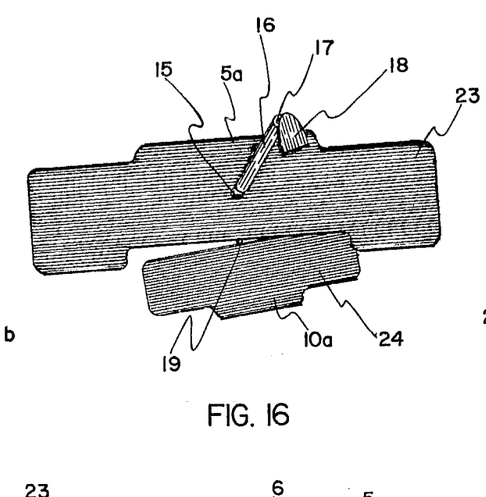
FIGS. 16 and 22 are rear elevational views of stylized shapes of the mirror system showing a single post-type permanent windshield mounting, and, showing the central adjustable connecting means between the two mirror frames.
Figure 18:
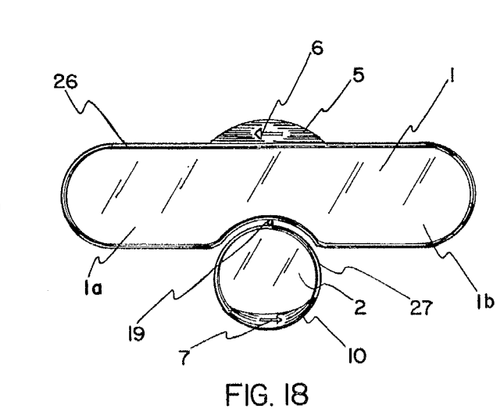
Figure 19:
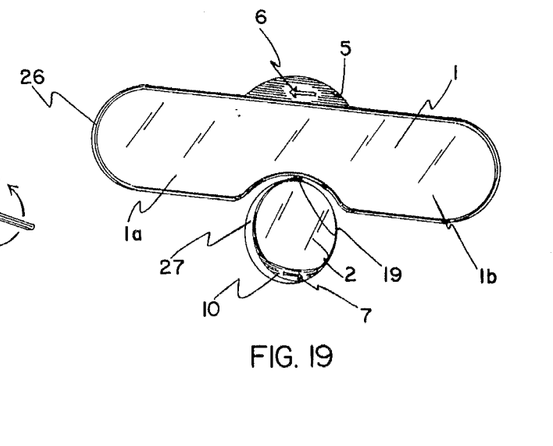
Figure 20:
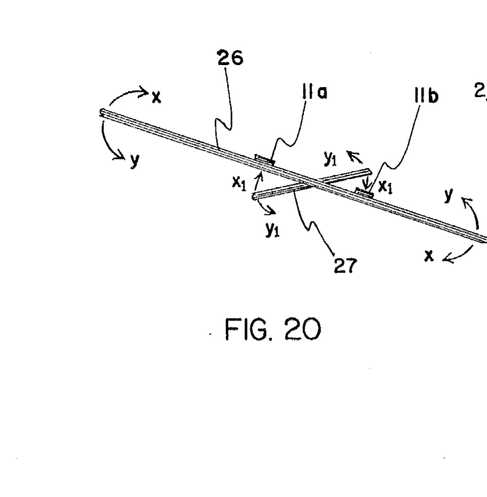

The mirror system shown in FIGS. 12 through 15 employs the same features described in FIG. 1 with off-centered pivotal connecting means, but is shaped generally rectangular. However, in FIGS. 16 and 17 which also features the rectangular shape, differ in that the pivotal connecting means between the two mirror frames are located centrally as shown by 19. Again the main mirror portions 1a and 1b enclosed in frame 23 are provided with a cut-out or indented portions to receive the dependent mirror 2 in frame 24 attached by pivotal connection means. The functions and general structures are basically the same as previously described.

Figure 21:
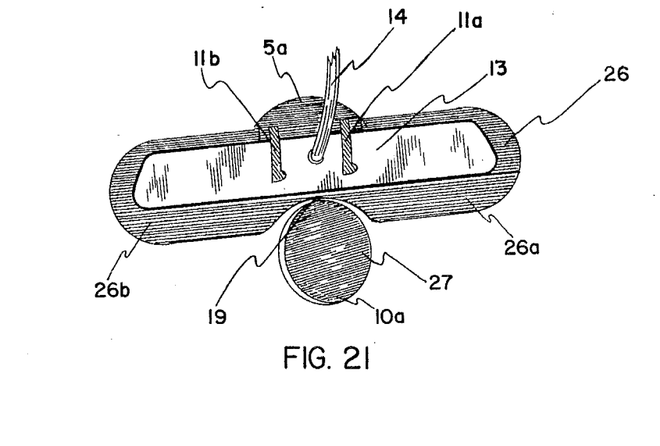
Figure 22:
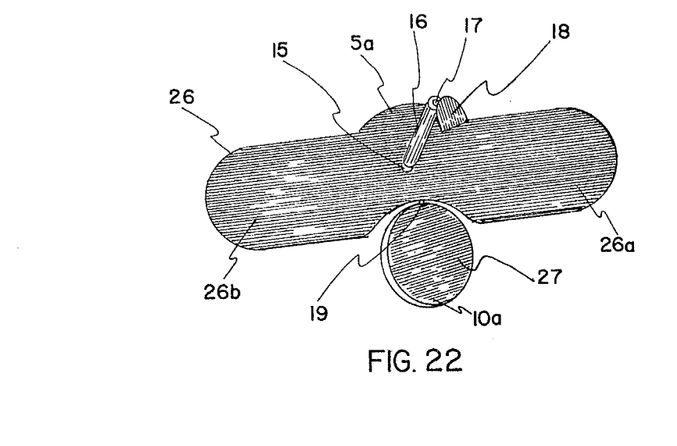
Figure 23:
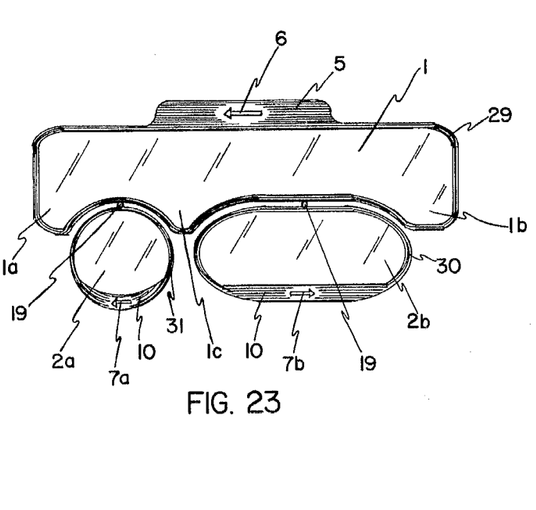
FIGS. 23 and 24 are front elevational views of the present mirror system wherein two mirrors are attached independently of the main mirror.
Figure 24:
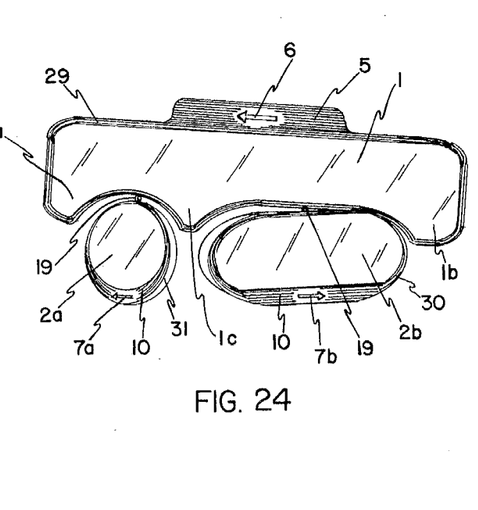
Figure 25:
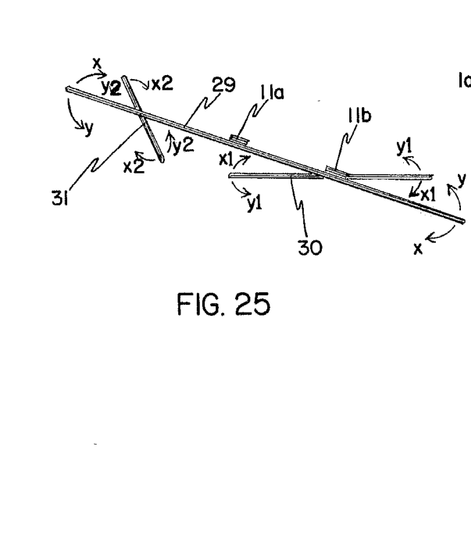
FIG. 25 is a top view of the mirror system of FIGS. 23 and 24 showing the two dependent mirrors adjusted relative to the main mirror, and, showing the clip-on means.

The mirror system shown in FIGS. 18 through 22 is similar to the above described systems and includes a main mirror portion 1a and 1b in a frame 26 having back portions 26a and 26b. There is a central arc-like indentation at the lower portion of the main mirror 1 and frame 26 to accomodate the circular dependent mirror 2 in frame 27 which is centrally attached by pivotal connecting means 19 to the main mirror frame 27. In FIG. 21 is shown the present invention in rear view and clip-on to existing mirror by a dual clip-on means 11a and 11b, but, in FIG. 22, the rear view of the present invention is shown with direct attachment for new automobiles as in FIGS. 6, 11 and 16 with similar attachment parts.

Figure 26:
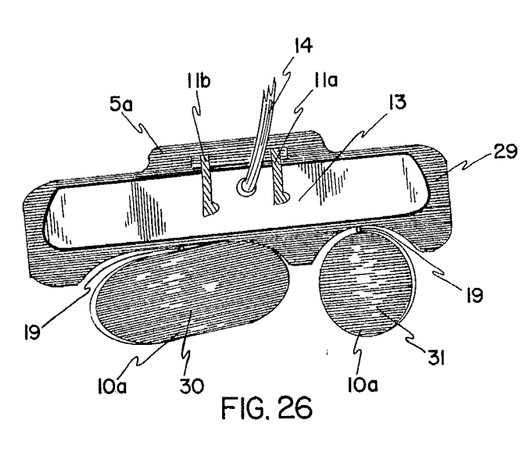
FIG. 26 is a rear elevational view of FIG. 24 showing a clip-on type attachment.
Figure 27:
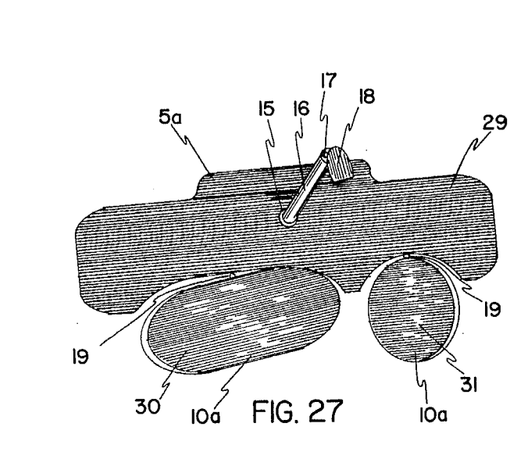
FIG. 27 is a rear elevational view of FIG. 24 showing a single post-type permanent windshield mounting.
Figure 28:
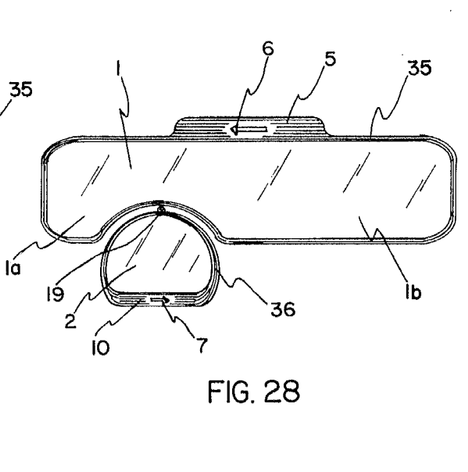
FIGS. 28 through 33 are front elevational views of another stylized shapes of the present mirror system showing the dependent mirror attached to the main mirror at various locations.
Figure 29:
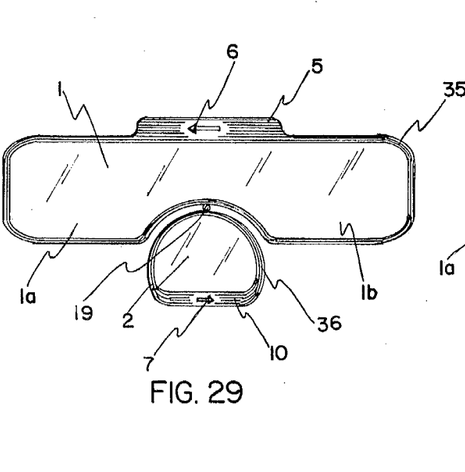
Figure 30:
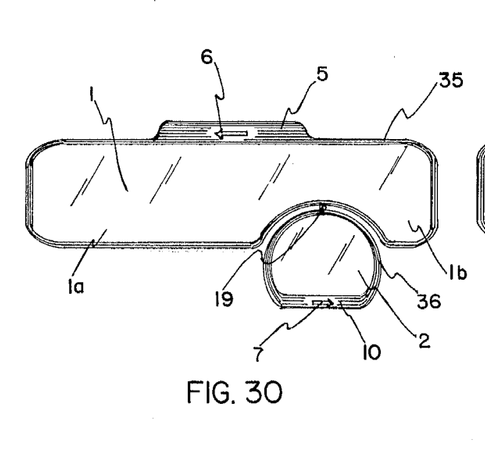
Figure 31:
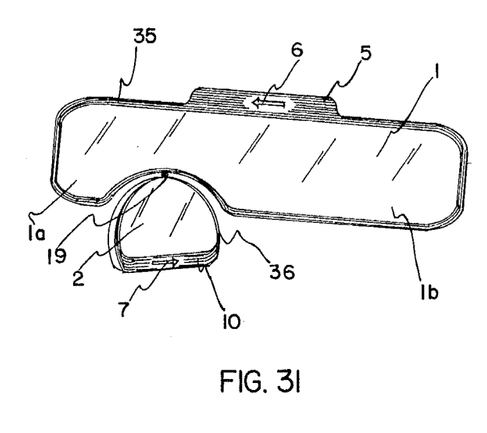
Figure 32:
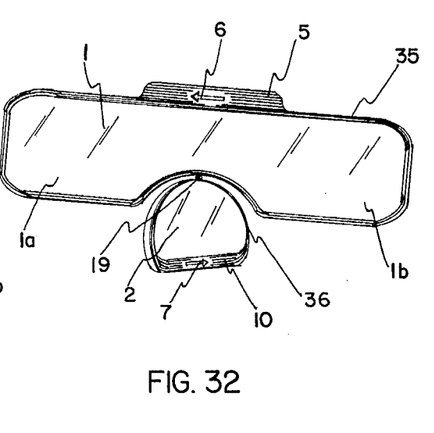
Figure 33:
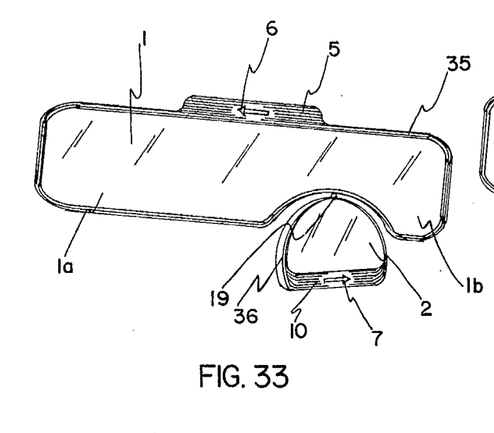

At FIGS. 23 through 27 is shown a mirror system wherein the front main mirror 1 including portions 1a, 1b and 1c in frame 29 is provided with a pair of dependent mirrors 2a and 2b in frames 31 and 30 respectively, and are received in complimentary recesses or cut-outs and separated by portion 1c and connection by central pivotal means 19. Main mirror 1 is provided with leftwise directed arrow indicia 6 in raised portion 5. Each dependent mirror is also provided with separate indicia 7a and 7b indicating direction of angular tilt as well as direction of vision. The various adjusted angles of the three mirrors can be achieved by movements indicated by X, Y; $X_1$, $Y_1$ and $X_2$, $Y_2$ at FIG. 25. In FIG. 26 which is the rear view of the mirror system of FIG. 24, the proper angular perspective of the various mirrors are shown and, the entire mirror system illustrated by dual clip-on means 11a and 11b for easy application to existing single mirrors. FIG. 27 shows rear view of the same mirror system in proper angular perspective of the same various mirrors, but the difference is that the entire mirror system is attached by a permanent attachment means for application to new automobiles; 10a is the back portion of 10 which contains the arrow indicia of the dependent mirrors. The main advantage of this three-mirrors system is the greatest multi-angular visual scope of side and lateral vision it encompasses.

At FIGS. 28 through 33 is shown a mirror system wherein the main mirror 1 including portions 1a and 1b in frame 35 is provided with a single dependent mirror 2 in frame 36. The location of the dependent mirror 2 in these alternative constructions may either be central or offset to the left or right as desired. Corresponding arrow indicia are also provided for the respective angular tilt and visual reference.

From the foregoing description it will be seen that several preferred embodiments of the rear view mirror system have been provided which will provide the vehicle driver with simultaneous rear and side vision enabling him to view rearward and to the right or left of the automobile during forward and rearward operation of the vehicle, the advantages of which will become clearly manifested.

The invention, as described, is susceptible to modification without departing from the inventive concept, and right is herein reserved to such modifications as fall within the scope and equivalence of the appended claims.

I claim:

1. A rearview mirror system for a vehicle adapted to be mounted on the vehicle and including at least a pair of adjustably interconnected framed mirrors which can be moved simultaneously or independently relative to each other, including an upper or main mirror adjustably connected to at least one lower or dependent mirror to collectively vary the reflective angles thereof, and wherein the lower section of the main mirror has a structural indentation or cut-out portion to accommodate part of the lower dependent mirror, the combination of said mirrors altogether provide adjustable rearward and lateral field of vision without substantial obstruction to the forward field of vision.

2. A rear view mirror system according to claim 1, wherein on at least one of the said mirrors is provided with indicia means to direct the proper right or left side tilt of the corresponding mirror having said indicia.

3. A mirror system according to claim 1, wherein at least one of the said mirrors is provided with indicia means to assist the driver with directional reminder for the correct lateral and rearward traffic conditions relevant to his vehicle.

4. A rear view mirror system according to claim 1, wherein the adjustable connecting means is centered with respect to the upper or main mirror.

5. A rear view mirror system according to claim 1, wherein the adjustable connecting means is offset from center with respect to the upper or main mirror.

6. A rear view mirror system according to claim 1, wherein both of said mirrors are provided with indicia to locate the right or left side of the vehicle in conjunction with the lateral and rearward traffic conditions.

7. A rearview mirror system according to claim 1, wherein the cut-out portion or structural indentation is complimentary in shape to the lower or dependent mirror.

8. A rear view mirror system according to claim 1, wherein the upper or main mirror is provided with mounting means for attaching said system to the windshield of a vehicle.

9. A rear view mirror system according to claim 1, wherein the upper or main mirror is provided with mounting means for attaching said system to an existing mirror on said vehicle.

10. A rearview mirror system according to claim 9, wherein the mounting means is a plurality of clips for securely attaching said mirror system over the existing rearview mirror already mounted on the vehicle.

11. A rear view mirror system according to claim 1, wherein the mirrors are generally rectangular in shape.

12. A rear view mirror system according to claim 1, wherein the mirrors are generally oval in shape.

13. A rear view mirror system according to claim 1, wherein the lower or dependent mirror is circular in shape.

14. A rearview mirror system for a vehicle adapted to be mounted on the vehicle, and, including a plurality of adjustably interconnected framed mirrors which can be moved simultaneously or independently relative to each other, including a larger upper or main mirror adjustably connected to a pair of smaller lower or dependent mirrors to accomplish a variety of reflective angles thereof, to adjustably enlarge or widen the scope of view of the driver relative to the rearward and right and left lateral fields of vision without substantial obstruction to the forward field of vision; and, wherein the lower section of the larger upper or main mirror is provided with a pair of structural indentations or cut-out portions to correspondingly accommodate each part of the respective smaller mirrors.

15. A rearview mirror system according to claim 14, wherein on each of the corresponding mirrors there is provided a respective arrow indicia to correspondingly locate the respective right or left side of the vehicle.

16. A rear view mirror system according to claim 14, wherein the adjustable connecting means is centered with respect to at least one of the lower or dependent mirrors.

17. A rear view mirror system according to claim 14, wherein the adjustable connecting means is offset from center with respect to at least one of the lower or dependent mirrors.

18. A rear view mirror system according to claim 14, wherein all of said mirrors are provided with indicia means to locate the right or left side of the vehicle in proper coordination with the lateral and rearward traffic conditions.

19. A rearview mirror system according to claim 14, wherein the cut-out portions or structural indentations of the upper mirror are complimentary in shape to the respective lower or dependent mirrors.

20. A rearview mirror system according to claim 14, wherein the upper or main mirror is provided with mounting means for attaching said system to the windshield of the respective vehicle.

21. A rearview mirror system according to claim 15, wherein the upper larger or main mirror is provided with mounting means for attaching said system to an existing mirror on said vehicle.

22. A rear view mirror system according to claim 21, wherein the mounting means is a clip means.

23. A rearview mirror system according to claim 14, wherein the lower smaller or dependent mirrors are differently shaped.

* * * * *